Sept. 27, 1960   J. PIGNONE   2,954,268
RECORDER PEN HOLDDOWN DEVICE
Filed Nov. 29, 1956
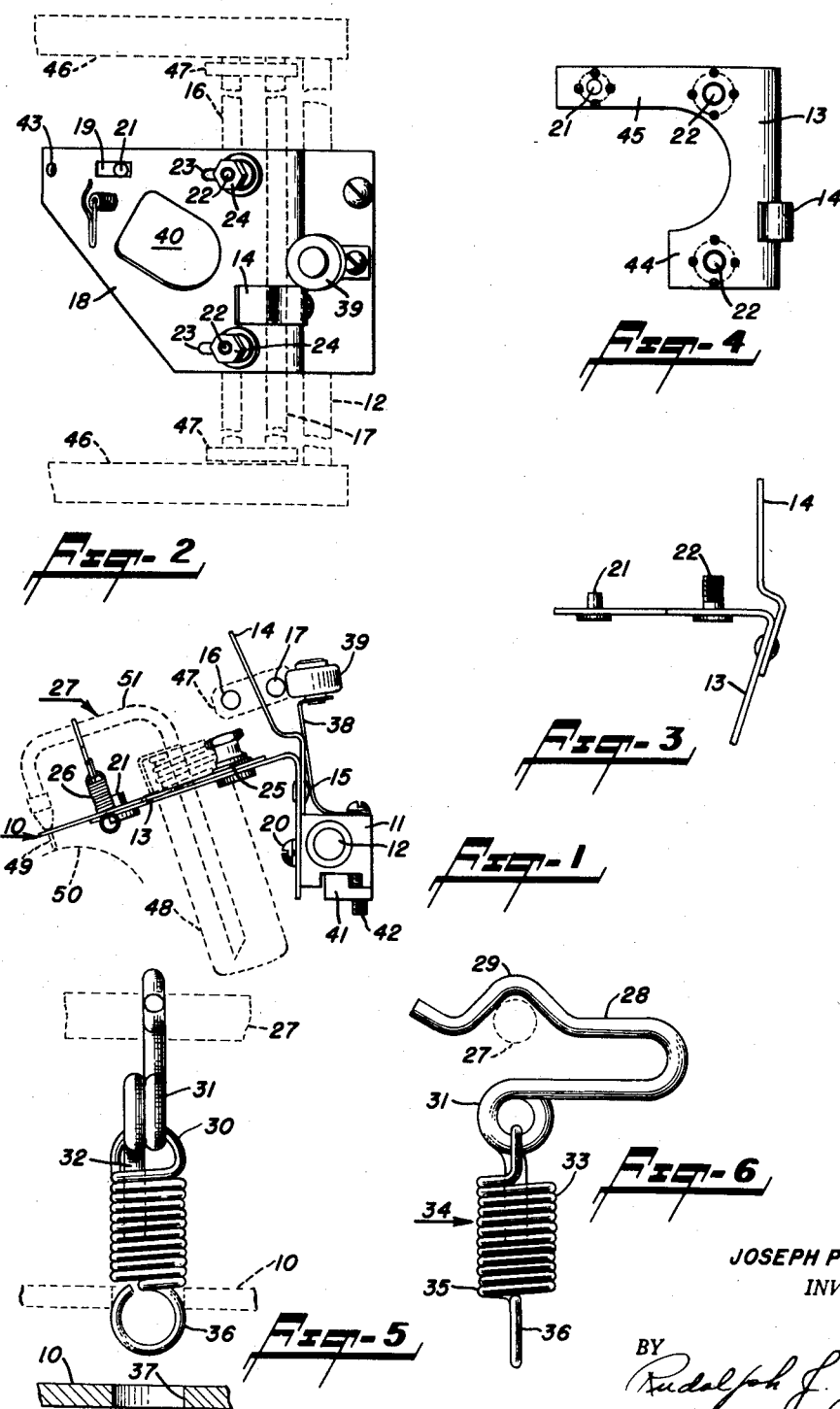
JOSEPH PIGNONE
INVENTOR.
BY
Rudolph J. Jurick
ATTORNEY

United States Patent Office 2,954,268
Patented Sept. 27, 1960

2,954,268

RECORDER PEN HOLDDOWN DEVICE

Joseph Pignone, West Orange, N.J., assignor, by mesne assignments, to Daystrom, Incorporated, Murray Hill, N.J., a corporation of New Jersey Filed Nov. 29, 1956, Ser. No. 625,075

1 Claim. (Cl. 346—140)

This invention relates to improvements in automatic indicating and recording apparatus and, more particularly, to a carriage of novel construction for holding a recording pen particularly adapted for use with such apparatus.

Recorders of the type to which this invention relates are useful in providing a measurement and record of variable conditions, such as temperatures. However, they are also designed to measure and record output from such primary elements as thermocouples, tachometer generator, photoelectric cells, resistance thermometer bulbs, and any transducer that provides an electrical output. Such recorders can also be employed to measure flow, pressure and weight by using suitable converters to provide an electrical output.

The indication and recording of the instantaneous state of a variable condition is usually accomplished by electrical networks which are adapted to be unbalanced by a variation in the condition and to effect an operation of a suitable rebalancing means. Such rebalancing operations include the actuation of suitable power means for simultaneously moving an inking pen or stylus over a constantly-movable, calibrated chart. In present recorders the pen and associated components are of complicated, delicate and costly construction.

In the present application, I am disclosing a pen carriage structure especially adapted for dual-pen two-zone recorder application. Transverse movement of the pen tip or stylus by means of a sliding support plate, makes it possible to mount two pens so as to be relatively adjustable on a nominal chart datum for purposes of record compensation. An additional novel feature is the means of lifting the pen and "caging" or supporting the carriage in lifted position, so as to be protected from vibration or shock, as such resulting from transportation in field use. There is also disclosed and claimed a novel pen retaining hook which has proved extremely effective, rugged, and convenient to manipulate.

An object of this invention is the provision of a novel recorder pen carriage especially adapted for dual-pen two-zone recorder use.

An object of this invention is the provision of a recorder pen carriage allowing for transverse movement of the pen tip or stylus by means of a sliding support plate, the construction allowing for two pens to be mounted so as to be relatively adjusted from a nominal chart datum for purposes of record compensation.

An object of this invention is to provide means for lifting the pen carriage and supporting it so as to be protected from vibration or shock resulting from transportation in field use.

An object of this invention is to provide a hook for resiliently holding a pen on its carriage, and which is rugged and convenient to manipulate.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

Figure 1 is an end elevational view of a pen carriage embodying my invention, a pen such as would be carried thereby and a chart engaged by the stylus thereof, being indicated by dotted lines;

Figure 2 is a plan of the carriage of Figure 1, portions of the recording mechanism frame and other members carried thereby being indicated by dotted lines;

Figure 3 is an end elevational view of the base plate of the carriage and its associated lifter arm;

Figure 4 is a plan of the parts shown in Figure 3;

Figure 5 is an enlarged elevational view of the resiliently-mounted pen retaining hook shown in Figures 1 and 2, and illustrating how it is assembled and disassembled with respect to the carriage;

Figure 6 is a view from the right of the hook and associated spring of Figure 5.

Referring to the drawings in detail, and first considering Figures 1 and 2, the pen carriage generally designated 10 is provided with a block or bearing member 11. The bearing member 11 is journaled and reciprocable on a cylindrical rod 12 supported by the frame 46 of the recorder and which forms a track for said bearing member. The carriage 10 comprises an angular lower or base plate 13 to the lower flange of which a lift member or arm 14 is secured, as by means of a rivet 15. Said lower flange is also suitably secured to the bearing member 11, as by screw means 20. The lift arm 14 is to be engaged by a lift or bail rod 16 swingable about an actuating shaft 17, for raising said carriage to upper position where the stylus 49 of the pen 27 is lifted from engagement with a chart on a suitable roll 50. In the nominal or operating position, shown in Figure 1, the bail or lift rod 16 is completely free from the carriage lift arm 14.

Circular displacement of the bail rod 16 is effected by the carrying shaft 17, to which it is secured as by means of arms 47. Said shaft 17, which is journaled in the frame 46, may be operated in accordance with the disclosure of my copending application, Serial No. 624,164, filed November 23, 1956, and entitled "Recorder Pen Lift Mechanism," now Patent No. 2,885,255, dated May 5, 1959. Such displacement when clockwise, as viewed in Figure 1, causes the lift arm 14 to be moved and tangentially embraced between the rod 16 and the shaft 17. If a resilient rotative force is applied to and maintained on the shaft 17, the bail rod 16 does not jar the carriage in lifting it, and provides a shock-absorbing support therefor in the "caged" or lifted position. In such position, accidental movement of the carriage along its cylindrical track 12, does not cause damage to the carriage or any recorder component, because of the novel structure and means of maintaining the carriage in lifted position.

Mounted on the carriage base plate 13, if transverse adjustment of the pen tip with respect to an adjoining pen is to be provided for, is a suitable slotted upper or shift plate 18. This plate 18 is provided with a slot 19 guidingly receiving a stud 21 upstanding from the base plate 13, and slots 23 guidingly receiving a pair of connecting members, such as threaded studs, screws, or bolts 22, also upstanding from the plate 13. The shift plate 18 is clamped in place with respect to the base plate 13 by means of thumb nuts 24, which may be tightened on the threaded studs 22 over desirably-employed washers 25 to thereby clamp the shift plate 18 with respect to the base plate 13.

The clamp, generally designated 26, is for resiliently holding a pen 27, desirably formed with a neck or ink tube portion 51 connecting a stylus or tip portion 49 with a reservoir portion 48, as described and claimed in my application, Serial No. 618,993, filed Oct. 29, 1956, and entitled "Recorder Pen," now Patent No. 2,829,026, dated April 1, 1958. The neck of such a pen 27 is indicated in Figure 6. The pen clamp 26 is assembled with respect to the shift plate, if used, or directly with respect to the base plate if such is used without a shift plate, as illustrated most clearly in Figure 5. In other words, the clamp comprises a hook device 29, formed as shown most clearly in Figures 5 and 6, and involving a downwardly opening notch formed by an upwardly curved portion which directly engages the neck 51 of the pen, and a lower portion helically wound, as indicated at 31, and with a tail portion 32 extended downwardly inside of the coils 33 of a supporting tension spring, generally designated 34.

The tension spring has a body portion 35 desirably tightly coiled, as illustrated in Figures 5 and 6, an upper hook portion 30 passing through the helically wound portion of the hook member 28, and a lower portion which is bent into a loop 36 of substantialy circular form and which lies in a plane axial of the tightly-wound portion 35 of said spring. The circular portion 36 of the tension spring is pushed through an aperture 37 in the carriage 10, that is, through one in the shift plate 18, or one in the base plate 13 if the shift plate 18 is not used. The loop 36, which engages the edge of the aperture 37 adjacent the bottom surface of the carriage 10, then expands to pull the lower coil of the spring 34 into engagement with the top surface of the carriage 10, so that when released said spring is held in erect position above said carriage. In other words, the aperture 37 is of such a size that the spring loop 36 may be snapped thereinto and, when this is done, the bottom of the tightly-coiled body portion 35 thereof engages the carriage to thereby hold the spring substantially normal to the plate 18, as indicated by the dotted line position of said carriage, designated 10 in Figure 5.

Not only is the spring 34 thus held erect when released, but also the pen-clamping hook device 29 attached to the spring, and which is provided with an outwardly projecting loop 28 as a covenient finger grip, is prevented from falling down on the carriage 10. This is accomplished by virtue of its projection or tail 32 into the bore of the tension spring coils 33, whereby said hook device 29 is also prevented from dropping down much from the upright position, illustrated in Figures 5 and 6. When the hook device 29 is disengaged from the pen 27 and released, the spring 34 remains upright and the hook, by reason of its tail being captive within the coils of the spring, is permitted to drop only slightly, to thereby facilitate replacement of the pen, providing an efficient, simple and unusually accessible pen clamping arrangement.

The shift plate 18, or if such is not used, the upper flange of the base plate 13, is not only provided with the aperture 37 for receiving the loop 36 of spring 34, but also has a relatively large aperture 40 for receiving the reservoir 48 of the pen 27. There is also an aperture 43, which is upwardly beveled and of a size proper for receiving the lower end portion of the inking stylus 49 of said pen, that is, even smaller than the aperture 37. If the shift plate 18 is used, the upper flange of the base plate 13 is bifurcated, as illustrated in Figure 4, to straddle the pen reservoir 48. The bifurcation 44 carrying only one of the threaded studs 22, is relatively short, while the bifurcation 45 is extended therebeyond to carry the stud 21.

In order to counterbalance the weight of the carriage 10, or limit the counterclockwise motion thereof, as viewed in Figure 2, I provide a resilient arm 38 connected to the carriage bearing 11, and on which is journaled a roller 39. The roller 39 rides on the operating shaft 17, counterbalancing the weight of the carriage, thereby assuring a desired pressure by the stylus of the pen on the chart, and normally determining the elevation of the carriage 10. The bearing 11 is also provided with a desirably L-shaped clamping plate 41, one arm of which extends into a downwardly-opening groove in said bearing, and the other arm of which is secured thereto by means of screw 42, and which serves for connecting thereto the conventional actuating cable (not shown).

Having now described my invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claim.

I claim:

In a recorder of the type including a pen having a reservoir, an ink-dispensing stylus and an ink tube leading from said reservoir to said stylus, and a plate with an aperture to receive the reservoir, one to receive the stylus, and a third aperture intermediate said stylus and reservoir apertures, an improved recorder pen holddown device for securing the pen to said plate comprising; a helical spring having a hook at its upper end portion and a lower end portion formed as a generally circular loop lying in a plane generally axial of said spring and of a size such that said loop may be pushed through said third aperture while contracting and engage the aperture-defining portions of the plate at the bottom and hold the end turn of the spring adjacent said looped portion in abutting relationship with the upper surface of said plate, to thereby hold the spring substantially normal to said plate, and a hook device, the lower portion of which is coiled around the spring hook and has a tail portion extended therebeyond into said spring, to hold it erect by preventing it from getting much out of line with respect to said spring and formed with a laterally-extending loop to be manually grasped for manipulation, a downwardly opening notch in the upper element of said loop to fit over the ink tube to resiliently hold the pen in place on the supporting plate or to conveniently release said pen from said plate.

References Cited in the file of this patent

UNITED STATES PATENTS

| | | |
|---|---|---|
| 756,158 | Couch | Mar. 29, 1904 |
| 1,207,994 | Parker | Dec. 12, 1916 |
| 1,392,757 | Gales | Oct. 4, 1921 |
| 1,648,030 | Roedding | Nov. 8, 1927 |
| 2,255,858 | Place | Sept. 16, 1941 |
| 2,289,817 | Williams et al. | July 14, 1942 |
| 2,392,916 | Gruss | Jan. 15, 1946 |
| 2,442,636 | Bertram | June 1, 1948 |
| 2,628,149 | Blakeslee | Feb. 10, 1953 |
| 2,673,138 | Bartley et al. | Mar. 23, 1954 |
| 2,694,615 | Clements | Nov. 16, 1954 |
| 2,775,502 | Sykora | Dec. 25, 1956 |